United States Patent
Hozumi

[11] Patent Number: 5,819,125
[45] Date of Patent: Oct. 6, 1998

[54] INFORMATION SETTING APPARATUS OF CAMERA

[75] Inventor: Toshiaki Hozumi, Tokyo, Japan

[73] Assignee: Nikon Corporation, Tokyo, Japan

[21] Appl. No.: 780,389

[22] Filed: Jan. 8, 1997

Related U.S. Application Data

[63] Continuation of Ser. No. 389,483, Feb. 16, 1995, abandoned.

[30] Foreign Application Priority Data

Feb. 16, 1994 [JP] Japan .................................. 6-019053

[51] Int. Cl.[6] .................................................. G03B 7/08
[52] U.S. Cl. ........................................................ 396/299
[58] Field of Search .................................. 396/237, 281, 396/287, 296, 297, 298, 299

[56] References Cited

U.S. PATENT DOCUMENTS

| | | | |
|---|---|---|---|
| 4,849,783 | 7/1989 | Kiyohara et al. ........................ | 354/442 |
| 4,890,134 | 12/1989 | Fujino et al. ........................... | 354/442 |
| 5,280,319 | 1/1994 | Sato et al. .............................. | 354/442 |
| 5,359,385 | 10/1994 | Ishida et al. ............................ | 354/412 |
| 5,448,334 | 9/1995 | Kaihara et al. ......................... | 395/297 |
| 5,479,237 | 12/1995 | Kitaoka .................................. | 395/299 |
| 5,485,238 | 1/1996 | Miura et al. ....................... | 354/289.12 |

FOREIGN PATENT DOCUMENTS 62-144147  6/1987  Japan .

Primary Examiner—Howard B. Blankenship

[57] ABSTRACT

An information setting apparatus of a camera includes an information storage unit, a display unit, a selecting unit, a step altering unit, an information setting unit, and a control unit. The information storage unit stores photographic information values pertaining to photography. The display unit displays the information values stored in the information storage unit. The selecting unit selects an information value by sequentially changing the display on the display unit step by step. The step altering unit alters the display step for the value of the photographic information on the information display unit within a specific range of the information value while the selecting unit is selecting an information value. The information setting unit sets, as the photographic information, the information value selected by the selecting unit and displayed on the display unit. The control unit controls the camera on the basis of the information set by the information setting unit.

7 Claims, 5 Drawing Sheets

INFORMATION SETTING APPARATUS OF CAMERA

This application is a continuation of application Ser. No. 08/389,483, filed Feb. 16, 1995, now abandoned.

BACKGROUND OF THE INVENTION

1. Field of the Invention

The present invention relates to an improvement in an information setting apparatus of a camera, which sets photographic information.

2. Related Background Art

Conventional information setting apparatuses of a camera use a dial incorporating a plate with a pattern of coded values each having a plurality of bits. These apparatuses perform a display by using a dial on which numerical values, such as shutter speeds of 1/125, 1/25, 0, 1/500 and aperture values of f2, f2.8, f4, f5.6, are graduated in units of steps, or by using a liquid crystal display device. While these numerical values are displayed, a user manipulates a dial or a button for changing settings. A consequent change in the counter output sequentially alters the numerical values in units of steps in accordance with prestored information. When a value which the user wishes to set is displayed, the user stops manipulating the setting changing member. In this manner the information setting is done.

Any of these information setting apparatuses is so designed as to be able to perform information settings in units of steps. Most users are satisfied with information settings in units of steps, so no problem arises for these users. However, some users including professional photographers are not satisfied with information settings in units of steps and require settings with minute steps, such as in units of ½ EV or ⅓ EV. To meet this requirement, a dial for setting a specific number of steps is provided in addition to the dial for settings in units of steps, or a switch for performing switching between the numbers of steps is provided.

In the conventional techniques as discussed above, the apparatuses are so designed as to be able to perform information settings in units of steps. Therefore, to meet the demand of some users including professional photographers, it is necessary to provide a dial in addition to the currently provided dial or a step number select switch. This requires an extra space and hence is unsuitable for a camera which is required to have compactness. In addition, since information must be changed with minute steps over the entire range, no rapid operation is possible. As a result, the operation becomes extremely cumbersome.

SUMMARY OF THE INVENTION

The present invention has been made in consideration of the above conventional problems and has as its object to provide an information setting apparatus of a camera, by which photographic information settings can be rapidly performed with minute steps over an intended range of a user with neither an increase in the size nor degradation in the operability of the apparatus.

An information setting apparatus of a camera according to the present invention comprises information storage means for storing a photographic information value pertaining to photography, display means for displaying the information value stored in the information storage means, selecting means for selecting the information value by sequentially changing a display on the display means step by step, step altering means for altering the display step for the value of the photographic information on the information display means within a specific range of the information value while the selecting means is selecting the information value, information setting means for setting, as the photographic information, the information value selected by the selecting means and displayed on the display means, and control means for controlling the camera on the basis of the information set by the information setting means.

The step altering means alters the display step for the photographic information, which is displayed on the information display means while the information selecting means is selecting the information value, to a desired step within a specific shutter speed range on the basis of shutter speed information. Also, the step altering means alters the display step for the photographic information, which is displayed on the information display means while the information selecting means is selecting the information value, to a desired step within a specific aperture value range on the basis of aperture value information.

In the information setting apparatus of a camera according to the present invention, the step altering means alters the display step for the photographic information, which is displayed on the information display means while the information selecting means is selecting the information value, to a desired step within a specific range on the basis of the shutter speed information or the aperture value information. Consequently, it is possible to prevent an increase in the size and degradation in the operability of the apparatus. In addition, the step altering means is capable of performing a step alteration corresponding to a change in the shutter speed information or the aperture value information. Furthermore, the step altering means sets a minute step within a shutter speed range or an aperture value range which is used frequently and a large step within a shutter speed range or an aperture value range which is not used frequently or within which the effect of an alteration to a minute step is insignificant. This allows a user to rapidly set the photographic information with minute steps over an intended range.

BRIEF DESCRIPTION OF THE DRAWINGS

FIG. 3A is a view for explaining the state in which all display segments of an external LCD are ON;

FIG. 3B is a view for explaining the state in which all display segments of an internal LCD are ON;

DETAILED DESCRIPTION OF THE PREFERRED EMBODIMENT

An embodiment of the present invention will be described in detail below with reference to the accompanying drawings.

Figure 1:
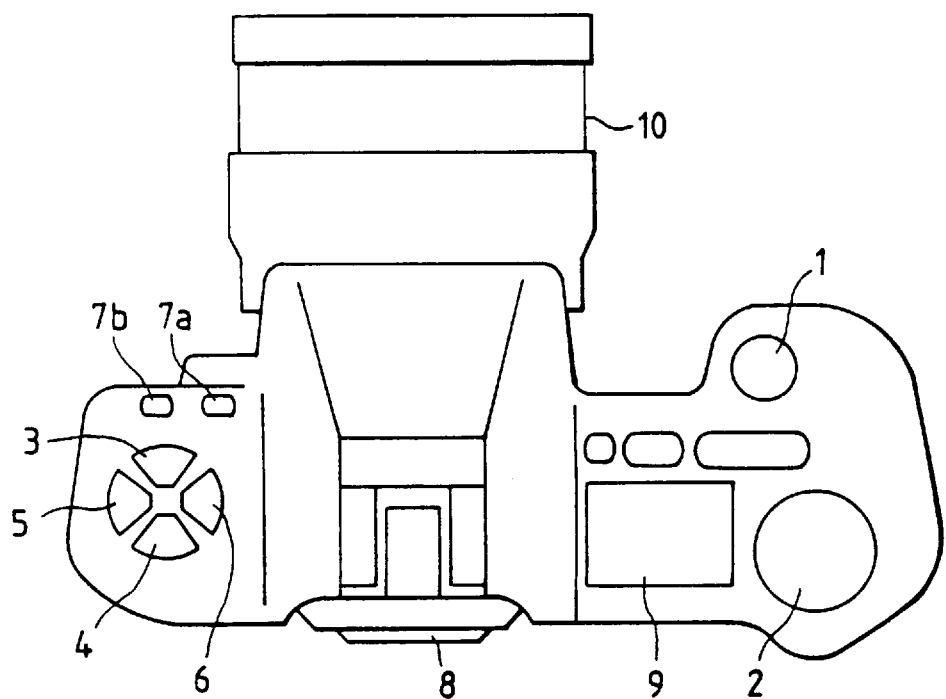
FIG. 1 is a top view showing the outer appearance of a camera.
Figure 2:
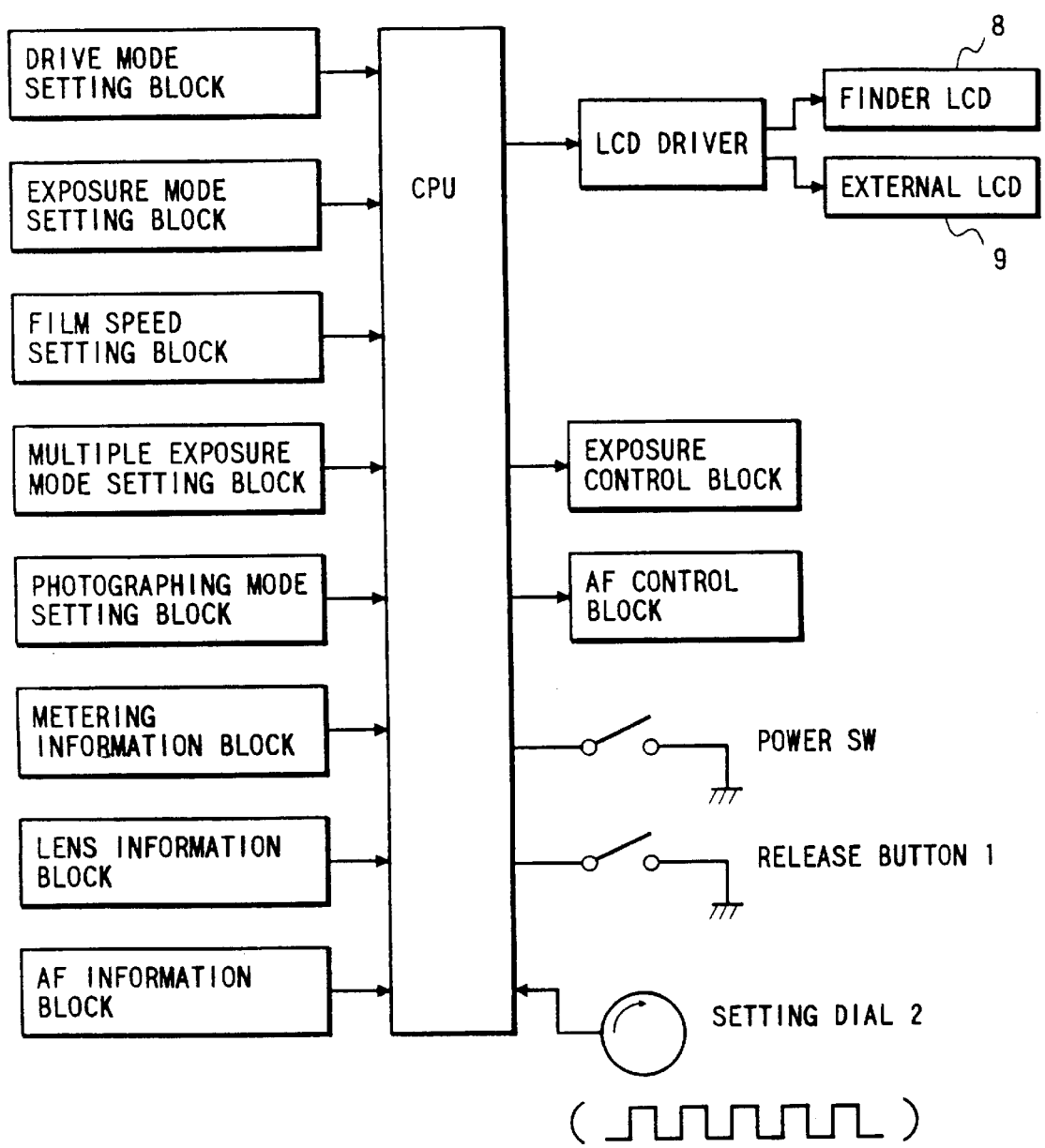
FIG. 2 is a block diagram of a CPU.

FIG. 1 is a top view showing the outer appearance of a camera according to the embodiment of the present invention. FIG. 2 is a block diagram of a CPU for controlling the entire camera of this embodiment.

Referring to FIG. 1, a camera main body of this embodiment primarily includes a release button 1, a setting dial 2, setting buttons 3 to 7b, a finder internal LCD 8, an external LCD 9, and a taking lens 10.

The setting button 3 is used to switch exposure control modes. When a user rotates the setting dial 2 while depressing the setting button 3, the exposure control mode is switched in the order of a program mode, a shutter speed priority mode, an aperture priority mode, and a manual mode.

The setting button 4 is for switching drive (feed) modes. By rotating the setting dial 2 with the setting button 4 depressed, the drive mode is switched between a continuous shooting mode and a one shot mode.

The setting button 5 is used to switch film speeds. When a user rotates the setting dial 2 while depressing the setting button 5, changing of the film speed and switching of DX are performed.

The setting button 6 is for setting the number of exposure times in multiple exposure photography. Settings and changes are made by rotating the setting dial 2 while the setting button 6 is depressed.

The setting buttons 7a and 7b are used to switch photographing control modes when the program mode is set as the exposure control mode. More specifically, the value (e.g., the shutter speed) of photographic information displayed on the external LCD 9 (to be described later) is changed by rotating the dial 2. When values (e.g., shutter speeds of $1/125$ sec and $1/1000$ sec) at the two ends of a range which a user wishes to display with minute steps are displayed, a specific range of photographic information values is set by depressing the setting button 7a. The setting button 7b is a switch of the type which holds its own depression state. While this switch is in a depressed state, the display step within the specific range set as above is a $1/3$ step (which corresponds to $1/3$ EV). When the button 7b is again depressed into a projected state, the display step is a $1/2$ step (which corresponds to $1/2$ EV). For example, when the specific range of the shutter speed is set as described above and the button 7b is depressed, the display is changed in units of steps corresponding to $1/3$ EV over the range of shutter speeds from $1/125$ to $1/1000$ sec. In the other range, the display is changed in units of steps corresponding to 1 EV.

To cancel the setting of the range, a user need only set other two end values of a new range. If only one value is selected, values larger than the selected value are set as the range. As an example, when the button 7a is pressed only for a shutter speed of $1/500$ sec, a range of shutter speeds faster than $1/500$ sec is set as the specific range.

A slide switch can also be used in place of the button 7b. In addition, the above arrangement can be altered such that switching is done as $1/2$ step→$1/3$ step→1 step each time the button 7b is pushed.

The finder internal LCD 8 is a display device for displaying information of, e.g., the shutter speed, the aperture, the number of frames, and focusing. The finder internal LCD 8 is constituted by an LCD (Liquid Crystal Display).

The external LCD 9 is a display device for displaying, e.g., the shutter speed, the aperture, the number of frames, and the film speed and is constituted by an LCD.

The control of a CPU will be described below with reference to FIG. 2.

The CPU receives information of the drive mode, the exposure control mode, the film speed, the multiple exposure mode, and the photographing control mode, which are set by rotating the setting dial 2 while depressing the setting buttons 3 to 7b, FIG. 1.

A metering information block meters the luminance of an object to be photographed by using a light-receiving element such as an SPD. The metering information block then performs A/D conversion for the metered result and sends the converted value to the CPU.

A lens information block supplies to the CPU information such as the focal length, the open aperture value, and the minimum aperture value output from the taking lens 10.

An AF information block outputs information pertaining to focusing to the CPU.

An exposure control block performs aperture control and drive control for a shutter (not shown) in accordance with commands from the CPU.

An AF control block drives and guides the taking lens 10 to an in-focus position by using a motor (not shown) or the like in accordance with commands from the CPU.

An LCD driver receives display data from the CPU and performs a display on the finder internal LCD 8 or on the external LCD 9 in accordance with the display data.

Figure 3A:
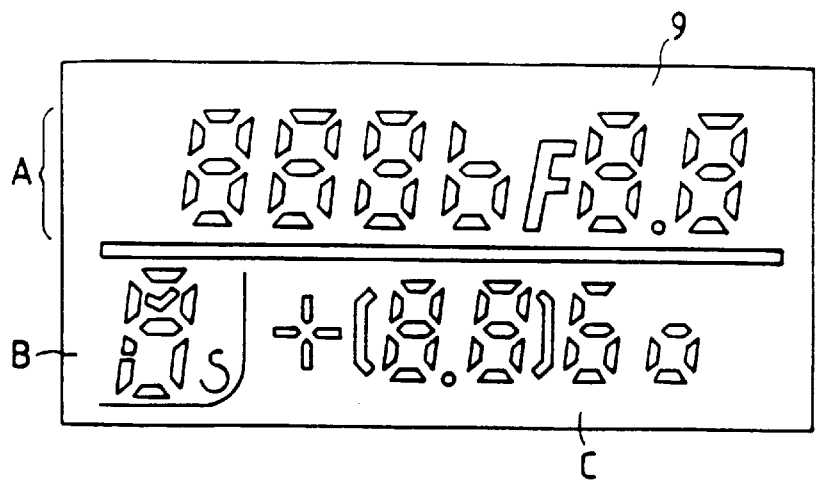
Figure 3B:
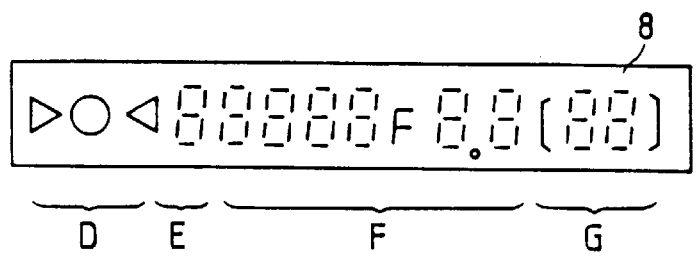

FIG. 3A is a view showing the state in which all display segments of the external LCD 9 of this embodiment are turned on. FIG. 3B is a view showing the state in which all display segments of the finder internal LCD 8 of this embodiment are turned on.

In FIG. 3A, the shutter speed and the aperture are displayed in a portion A, the exposure control mode is displayed in a portion B, and the exposure correction value, the film speed, the number of frames, and the photographing control mode are displayed in a portion C. In FIG. 3B, AF focusing information is displayed in a portion D, the exposure control mode is displayed in a portion E, the shutter speed and the aperture are displayed in a portion F, and the number of frames and the photographing control mode are displayed in a portion G.

Figure 4A:
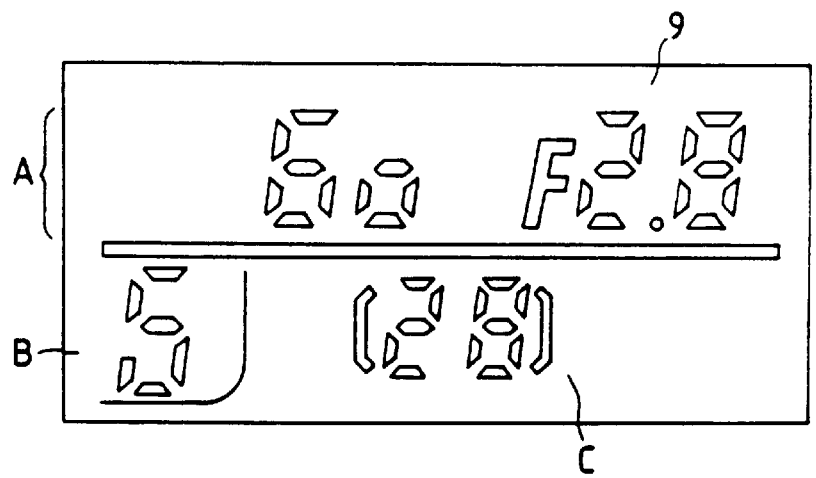
FIG. 4A is a view showing the state in which control values are displayed on the external LCD.

FIG. 4A shows an illustrative display of the segments of the external LCD 9 of this embodiment. The display in FIG. 4A indicates that the shutter speed is $1/60$, the aperture value is 2.8, the exposure control mode is the shutter priority mode, and the number of frames is 28.

Figure 4B:
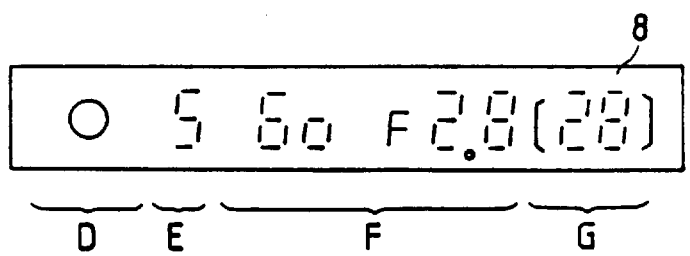
FIG. 4B is a view showing the state in which control values are displayed on the internal LCD.

FIG. 4B shows an illustrative display of the segments of the internal LCD 8 of this embodiment. The display in FIG. 4B indicates that the shutter speed is $1/60$, the aperture value is 2.8, the exposure mode is the shutter priority mode, and the number of frames is 28.

If the photographic information $1/60$ which is set and displayed as discussed above falls within a specific photographic information range, a display is done with minute steps. If the photographic information falls outside the particular range, a display is done with large steps.

When the dial 2 is rotated in this state, an internal switch (not shown) of the dial is turned on and off repeatedly. Consequently, up and down signals are applied to the CPU in accordance with the turning ON and OFF of the switch. If the dial 2 is rotated clockwise, an exposure calculation is performed in the direction of a high value of "+1" EV. If the dial 2 is rotated counterclockwise, the calculation is performed in the direction of a low value of "−1" EV.

Figure 5A:
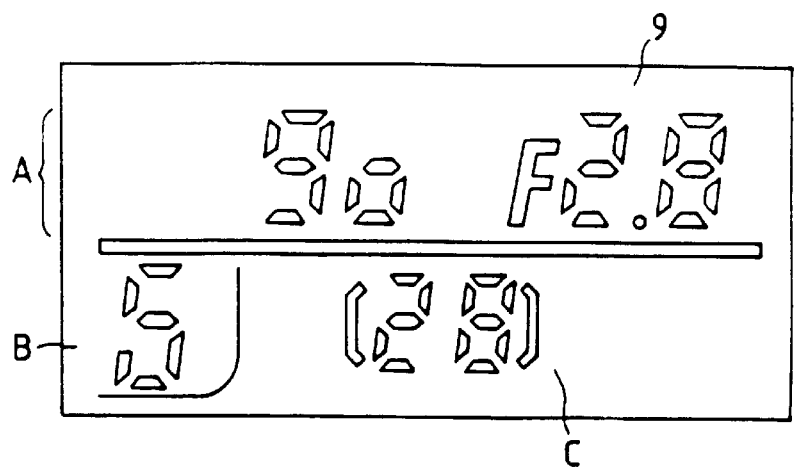
FIG. 5A is a view showing the display of the external LCD when a dial is rotated counterclockwise from the state shown in FIG. 4A.
Figure 5B:
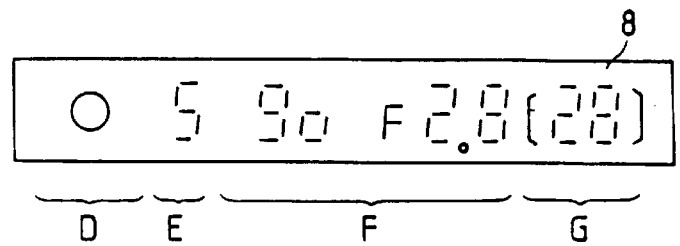
FIG. 5B is a view showing the display of the internal LCD when the dial is rotated counterclockwise from the state shown in FIG. 4B.
Figure 6A:
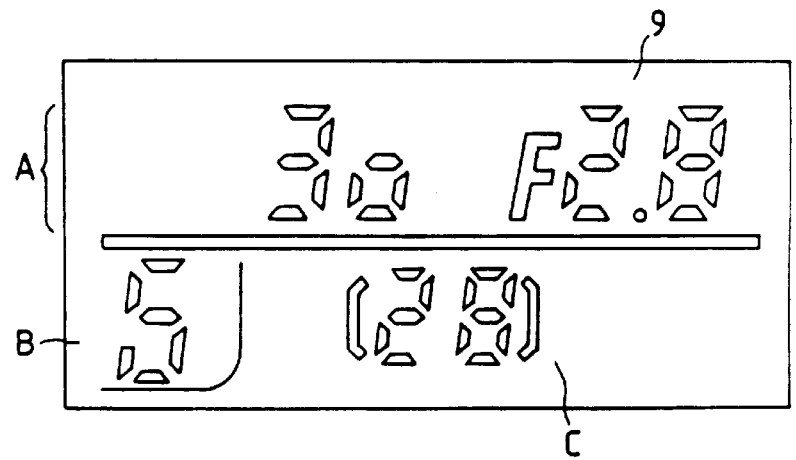
FIG. 6A is a view showing the display of the external LCD when the dial is rotated clockwise from the state shown in FIG. 4A.
Figure 6B:
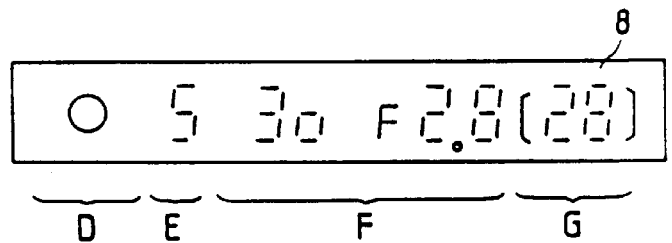
FIG. 6B is a view showing the display of the internal LCD when the dial is rotated clockwise from the state shown in FIG. 4B.

Assume, for example, that the minute step set within the specific range is a ½ step. Assume also that a combination of 1/60 and f2.8 is displayed in FIGS. 4A and 4B of this embodiment. In this case, assuming 1/60 is a set value which defines the specific range, shutter times shorter than 1/60 are displayed in units of ½ steps, and shutter times longer than 1/60 are displayed in units of 1 steps. If the dial 2 is rotated counterclockwise in this state, the value is changed from "1/60" to "1/90" (i.e. changed by ½ step) and displayed as shown in FIGS. 5A and 5B. If the dial 2 is rotated clockwise, the value is changed from "1/60" to "1/30" (i.e., changed by one step) and displayed as illustrated in FIGS. 6A and 6B.

Figure 7:
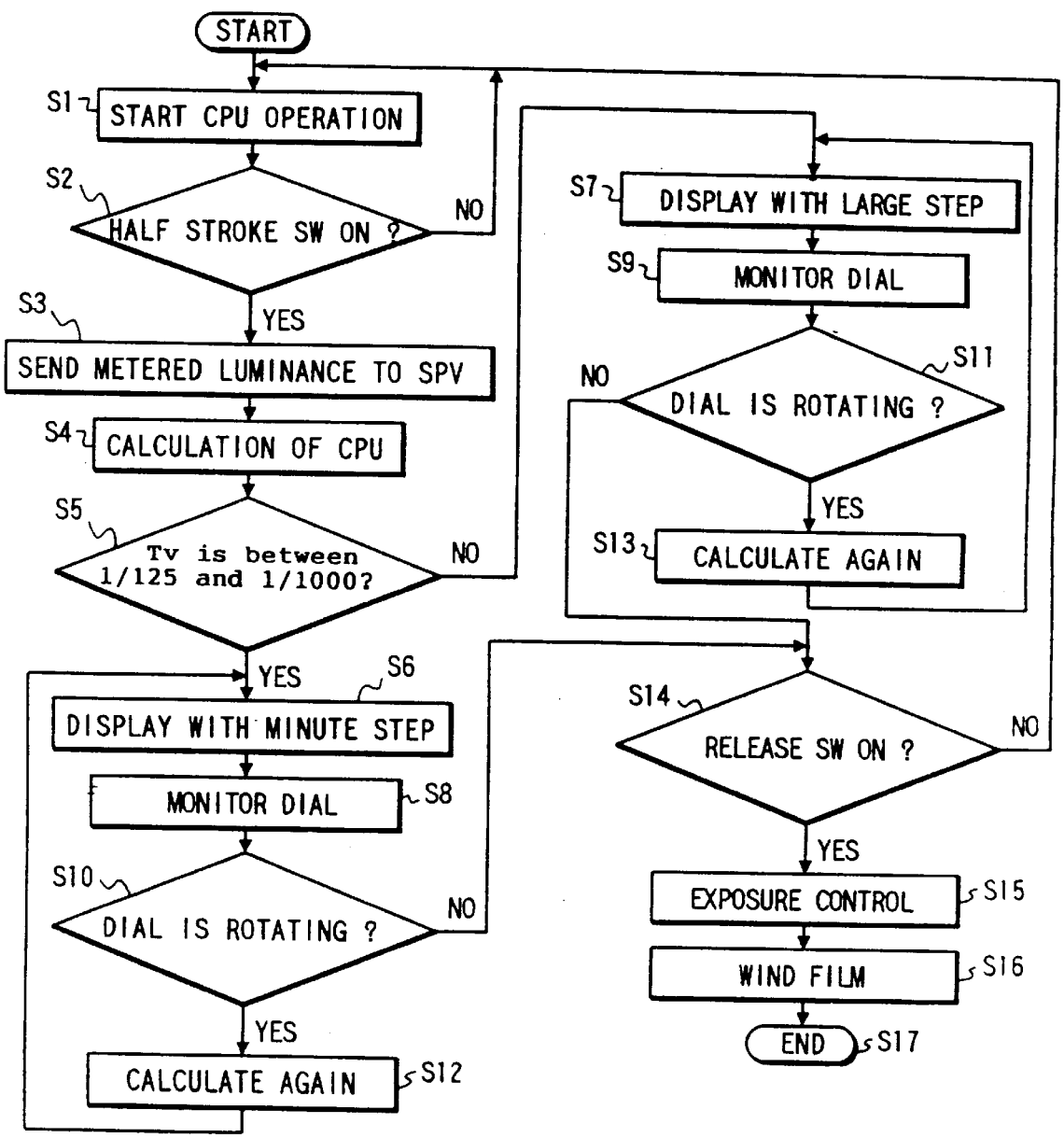
FIG. 7 is a flow chart for explaining the operation of the camera.

The above camera operation will be described below with reference to the flow chart in FIG. 7. Note that in this embodiment, setting of the shutter speed will be described as an example. However, other photographic information such as the aperture value or the film speed is set in the same fashion as the shutter speed. Note also that in the following description, it is assumed that an operation of setting a specific shutter speed range between 1/125 and 1/1000, which is to be set with minute steps, is already done.

Step 1: When the power switch of the camera is turned on, the CPU starts an operation.

Step 2: The CPU checks the state of a half stroke switch. If the switch is ON, the flow advances to step 3. If the switch is OFF, the flow returns to step 1.

Step 3: The CPU fetches metering information from the light-receiving element, and the flow advances to step 4.

Step 4: The luminance of the metering information is sent to the CPU, and the flow advances to step 5.

Step 5: If the photographic information set in the CPU falls within the specific range (between 1/125 and 1/1000), the flow advances to step 6 for display with minute steps. Otherwise, the flow advances to step 7 for display with large steps.

Step 6: The CPU performs display with minute steps on the external and internal LCDs, and the flow advances to step 8.

Step 7: The CPU performs display with large steps on the external and internal LCDs and monitors the rotation of the dial 2. The flow advances to step 9.

Step 8: The CPU monitors the rotation of the dial 2 for a predetermined time, and the flow advances to step 10.

Step 9: The CPU monitors the rotation of the dial 2 for a predetermined time, and the flow advances to step 11.

Step 10: The CPU checks whether the dial 2 is rotating. If the CPU detects the rotation of the dial 2, the flow advances to step 12; otherwise, the flow advances to step 14.

Step 11: The CPU checks whether the dial 2 is rotating. If the CPU detects the rotation of the dial 2, the flow advances to step 13; otherwise, the flow advances to step 14.

Step 12: If the CPU detects the rotation of the dial 2, the CPU performs a calculation corresponding to the rotation. The flow advances to step 6.

Step 13: If the CPU detects the rotation of the dial 2, the CPU performs a calculation corresponding to the rotation. The flow advances to step 7.

Step 14: The CPU checks whether the release SW is turned on. If the release SW is ON, the flow advances to step 15; otherwise, the flow returns to step 1.

Step 15: The CPU performs exposure control for the shutter and the aperture, and the flow advances to step 16.

Step 16: The CPU performs winding of the film, and the flow advances to step 17.

Step 17: END (in the case of one shot model).

As discussed above, in this embodiment the setting step can be switched between a ½ step and a 1 step by setting a specific range. Since in this embodiment a range is specified in setting the photographic information, the apparatus is not increased in size. This makes it possible to keep the compactness of the camera. Since it is also possible to set a desired range and step, switching can be performed with an arbitrary combination of the range and the step.

As has been discussed above, minute steps are automatically set for a range required for a user, and large steps are also automatically set for a range within which no minute steps are necessary. The result is a camera which is improved in operability and easy to use.

What is claimed is:

1. An information setting apparatus of a camera, comprising:

information storage means for storing photographic information values pertaining to photography;

display means for displaying the photographic information value stored in said information storage means;

selecting means for selecting one of the photographic information values by sequentially changing a display on said display means;

automatic step altering means for automatically altering a display step size, chosen from a plurality of step sizes, for the one of the photographic information values on said information display means based on a range of the one of the photographic information values while said selecting means is selecting the one of the photographic information values and based on manipulation of a single member by a user;

information setting means for setting the one of the photographic information values selected by said selecting means and displayed on said display means; and control means for controlling said camera on the basis of the one of the photographic information values set by said information setting means.

2. An apparatus according to claim 1, further comprising range setting means for setting the range of the one of the photographic information values.

3. An apparatus according to claim 1, wherein said selecting means selects the one of the photographic information values in units of regular fixed steps based on the range of the one of the photographic information values.

4. An apparatus according to claim 1, wherein the one of the photographic information values is shutter speed information, and said automatic step altering means automatically alters the display step for a shutter speed value on said information display means within a range of the shutter speed value.

5. An apparatus according to claim 4, wherein said automatic step altering means automatically alters the step such that a relatively small step is set within a first shutter speed range which is used frequently and a relatively large step is set within a second shutter speed range which is not used frequently or within which an effect of the small step is insignificant.

6. An apparatus according to claim 1, wherein the one of the photographic information values is aperture value information, and said automatic step altering means automatically alters the display step for an aperture value on said information display means within a range of the aperture value.

7. An apparatus according to claim 6, wherein said automatic step altering means automatically alters the step such that a relatively small step is set within a first aperture value range which is used frequently and a relatively large step is set within a second aperture value range which is not used frequently or within which an effect of the small step is insignificant.

* * * * *

UNITED STATES PATENT AND TRADEMARK OFFICE
CERTIFICATE OF CORRECTION

PATENT NO.: 5,819,125
DATED : October 6, 1998
INVENTOR(S): Toshiaki HOZUMI

It is certified that error appears in the above-identified patent and that said Letters Patent is hereby corrected as shown below:

Claim 1, Col. 6, line 31, change "value" to --values--.

Signed and Sealed this

Twenty-third Day of February, 1999

Attest:

Q. TODD DICKINSON

Attesting Officer

Acting Commissioner of Patents and Trademarks